United States Patent [19]
Jacobson et al.

[11] 3,942,716
[45] Mar. 9, 1976

[54] FLOW-THRU VACUUM BUSHING FOR ULTRACENTRIFUGES

[75] Inventors: Kenneth E. Jacobson, Fremont; Gary C. Thomas, Los Altos, both of Calif.

[73] Assignee: Beckman Instruments, Inc., Fullerton, Calif.

[22] Filed: Jan. 15, 1973

[21] Appl. No.: 323,447

[52] U.S. Cl. .................. 233/1 A; 233/27; 184/6.16
[51] Int. Cl.² .................. B04B 15/02; B04B 15/08
[58] Field of Search ............ 233/1 R, 1 A, 11, 23 R, 233/24, 27; 184/6.16

[56] References Cited
UNITED STATES PATENTS

| | | | |
|---|---|---|---|
| 1,401,196 | 12/1921 | Sharples | 233/21 |
| 1,445,722 | 2/1923 | Sharples | 233/21 |
| 1,561,784 | 11/1925 | Hall | 233/1 R |
| 2,733,857 | 2/1956 | Beams | 233/24 |
| 3,327,938 | 6/1967 | Stallmann | 233/1 R |

Primary Examiner—George H. Krizmanich
Attorney, Agent, or Firm—R. J. Steinmeyer; F. L. Mehlhoff

[57] ABSTRACT

A vacuum bushing for an ultracentrifuge that minimizes excessive oil loss due to the high pressure differential across the bushing and allows automatic reclaiming and reusing of a major portion of the uncontaminated oil flow. The bushing is provided with first and second annular chambers, one chamber being connected to an atmospheric oil reservoir and the other chamber being connected to a vacuum oil reservoir. The major oil flow is from the atmospheric reservoir to the first chamber, along the rotor drive shaft to the second chamber, and then to the vacuum reservoir. The vacuum reservoir is connected to the atmospheric reservoir by a one-way check valve so that the oil is automatically returned to the atmospheric reservoir when the centrifuge is deactivated and the vacuum released.

9 Claims, 2 Drawing Figures

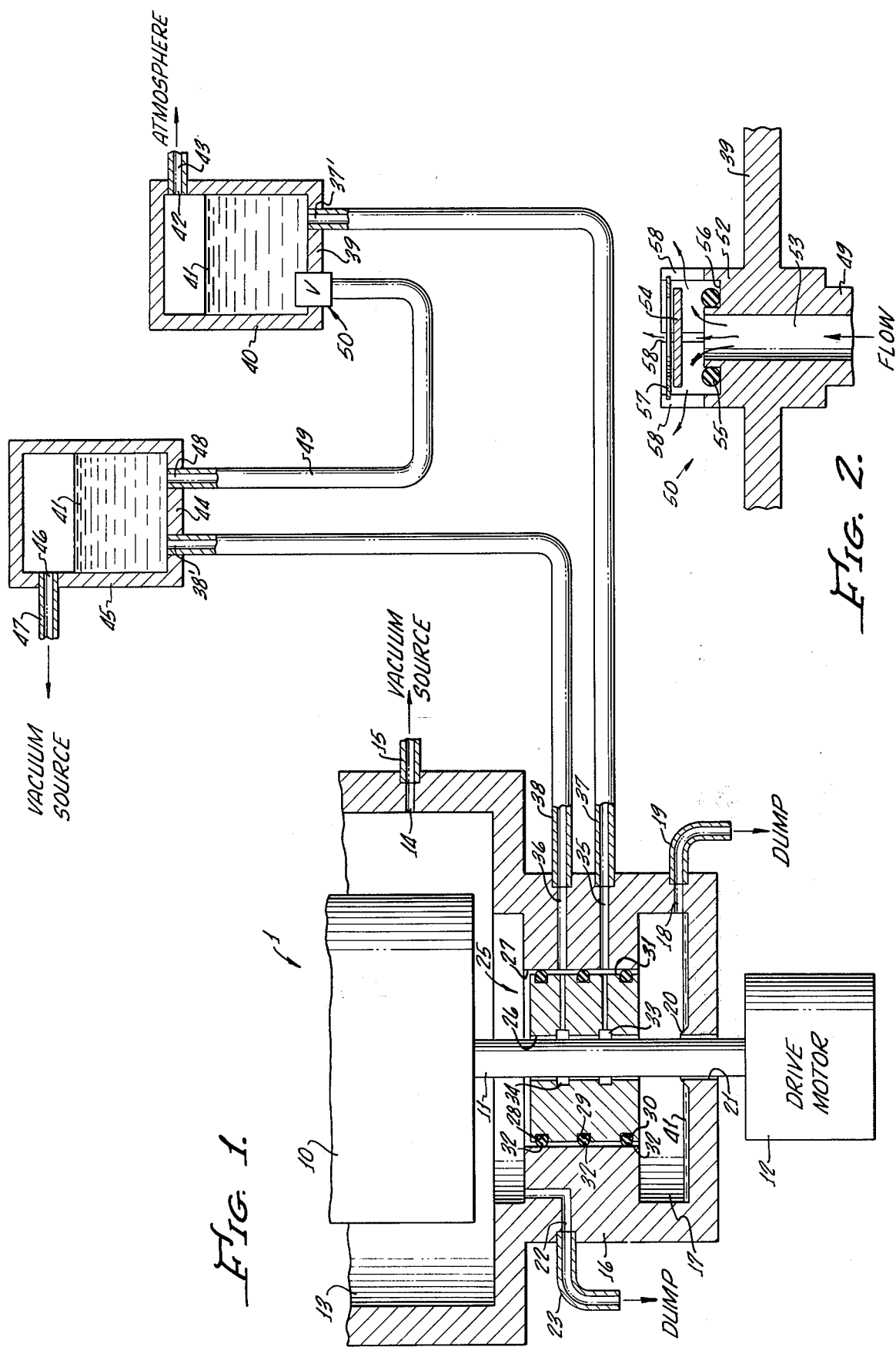

FLOW-THRU VACUUM BUSHING FOR ULTRACENTRIFUGES

BACKGROUND OF THE INVENTION

1. Field of the Invention

The present invention relates to a flow-thru vacuum bushing for ultracentrifuges and, more particularly, to a vacuum bushing for an ultracentrifuge that minimizes excessive oil loss and allows automatic reclaiming and reusing of a major portion of the uncontaminated oil flow.

2. Description of the Prior Art

It is known in the art of centrifugation to position a rotor in a chamber from which all atmosphere is evacuated. By operating the rotor in a vacuum, substantially higher speeds are permissible than when the rotor is operated in an atmospheric environment.

A typical vacuum bushing-type drive system for a vacuum centrifuge includes a bushing through which the rotor drive shaft passes from atmospheric conditions into the evacuated rotor chamber. The bushing has an annular chamber surrounding the drive shaft, adjacent the atmospheric side of the bushing. The annular chamber is connected to an oil reservoir at atmospheric pressure positioned at a height somewhat above the annular chamber. Thus, oil flows by gravity from the oil reservoir to the annular chamber.

Upon reaching the annular chamber, the oil can flow along the drive shaft in two directions. One path is downward through the clearance between the shaft and the bushing into a drive sump. Since the oil reservoir and drive sump are both at atmospheric pressure, the pressure differential in this path, between the annular chamber and the drive sump, is equal to the difference in height between the oil reservoir and the first annular chamber.

The other path is upward through the clearance between the drive shaft and the bushing into the rotor chamber. Because there is a vacuum in the rotor chamber, the differential head pressure in this path, between the annular chamber and the rotor chamber, is approximately 30 feet. Tests show that about 85% to 95% of the oil flows along this path, due to the greater pressure difference.

This type of system is designed on the premise that the clearance between the rotating drive shaft and the bushing is such that the vacuum pump associated with the rotor chamber can pump more air out of the rotor chamber than can pass through the bushing in the oil. As the maximum speed of a centrifuge is upgraded, the clearance must be opened so that more oil passes through for lubrication. While this does not present a problem with maintaining the vacuum, it does increase the oil usage since the oil that passes through the bushing into the rotor chamber is contaminated and unusable. This is not only an inconvenience to the user but also becomes troublesome to the centrifuge itself due to oil contamination of other systems in the rotor chamber.

Many attempts have been made to solve this problem. It has been often suggested that a completely closed system be provided to recover the oil. However, none of the systems proposed heretofore have been successful for one or more reasons. In some cases, there is still a substantial amount of lost oil. In other cases, even though the excessive oil loss has been minimized, the oil reclaimed has been contaminated and incapable of reuse.

SUMMARY OF THE INVENTION

In accordance with the present invention, these problems are solved by providing a flow-thru vacuum bushing for an ultracentrifuge. The present bushing design minimizes excessive oil loss due to the high pressure differential across the bushing. In addition, the present bushing allows automatic reclaiming and reusing of a major portion of the oil flow. Furthermore, such reclaimed oil is uncontaminated and may be reused with no difficulty. According to the present invention, the oil supply from one reservoir is collected in a second reservoir and automatically returns to the first reservoir from the second reservoir when operation of the centrifuge is completed.

Briefly, the present flow-thru vacuum bushing is provided with first and second annular chambers, one chamber being connected to an atmospheric oil reservoir and the other chamber being connected to a vacuum oil reservoir. The major oil flow is from the atmospheric reservoir to the first chamber, along the rotor drive shaft to the second chamber, and then to the vacuum reservoir. The vacuum reservoir is connected to the atmospheric reservoir by a one-way check valve so that the oil is automatically returned to the atmospheric reservoir when the centrifuge is deactivated and the vacuum released.

OBJECTS

It is therefore an object of the present invention to provide a flow-thru vacuum bushing for ultracentrifuges.

It is a further object of the present invention to provide a flow-thru vacuum bushing for ultracentrifuges which minimizes excessive oil loss due to the high pressure differential across the bushing.

It is a still further object of the present invention to provide a flow-thru vacuum bushing for ultracentrifuges that allows automatic reclaiming and reusing of a major portion of the uncontaminated oil flow.

It is another object of the present invention to provide a check valve with no wearing parts for use with a flow-thru vacuum bushing in an ultracentrifuge.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts of the several figures and wherein:

BRIEF DESCRIPTION OF THE DRAWINGS

FIG. 1 is a schematic cross-sectional view of an ultracentrifuge incorporating the present flow-thru bushing; and FIG. 2 is an enlarged sectional view of a portion of the apparatus of FIG. 1.

DESCRIPTION OF THE PREFERRED EMBODIMENT

Referring now to the drawings and, more particularly, to FIG. 1 thereof, there is shown a centrifuge, generally designated 1, including a rotor 10 connected to a drive shaft 11 which is driven by a motor 12. Rotor 10 is positioned within a chamber 13 having a passage 14 connected to a conduit 15. Conduit 15 is connectable to a source of vacuum (not shown) so that the air within chamber 13 may be evacuated.

The base 16 of chamber 13 is provided with a bushing or bearing member, generally designated 25, having an axial bore 26 through which drive shaft 11 passes. Immediately below bushing 25, base 16 is provided with a sump 17 where oil 41 escaping from bushing 25 may accumulate.

The bottom of base 16 of chamber 13 is provided with an axial bore 21 through which drive shaft 11 passes. The clearance between drive shaft 11 and bore 21 is large enough that atmospheric conditions exist in sump 17. Base 16 has a lip 20 surrounding shaft 11 so that the oil flowing along shaft 11 accumulates within sump 17, as shown. Furthermore, base 16 has a passage 18 therethrough which connects with a conduit 19, passage 18 acting as an over flow prevention device to conduct the excess oil accumulating within sump 17 to a suitable dump.

Bushing 25 is a generally cylindrical member positioned within a cylindrical bore 27 in base 16 of centrifuge 1. Bushing 25 has three annular grooves 28, 29, and 30 spaced axially in the outer surface 31 thereof. "O" rings 32 positioned within grooves 28–30 seal chamber 13 from sump 17.

Bushing 25 has first and second annular chambers 33 and 34 in the inner surface thereof, surrounding drive shaft 11. Annular chamber 33 is positioned closest to sump 17 whereas annular chamber 34 is positioned closest to rotor chamber 13. Chambers 33 and 34 are connected via inlet and outlet passages 35 and 36, respectively, to conduits 37 and 38, respectively. Passages 35 and 36 extend through base 16 of chamber 13 and also through bushing 25. "O" rings 32 prevent oil leakage in the area between bore 27 and surface 31 of bushing 25.

Conduit 37 is connected to a passage 37' in the bottom 39 of a first oil reservoir 40 for storing lubricating oil 41 therein. Reservoir 40 has a passage 42 near the top thereof connected to a conduit 43 opened to the atmosphere. Oil reservoir 40 may have any suitable type of opening (not shown) for filling same with oil 41.

Conduit 38 is connected to a passage 38' in the bottom 44 of a second oil reservoir 45 for storing oil 41 therein. Reservoir 45 has a passage 46 near the top thereof connected to a conduit 47 which is adapted to be connected to the vacuum source (not shown). Reservoir 45 has a second passage 48 in bottom 44 thereof which is connected to a conduit 49. Conduit 49 is connected to bottom 39 of reservoir 40 via a one-way check valve, generally designated 50, to be described more fully hereinafter.

In operation, centrifuge 1 and, more specifically, bushing 25, is designed on the premise that the clearance between shaft 11 and bore 26 in bushing 25 is such that the vacuum source can pump more air out of chamber 13 than can pass through bore 26 in oil 41. In centrifuge 1, oil 41 is fed from atmospheric reservoir 40 through a first conduit means including conduit 37 and inlet passage 35 to annular chamber 33. It should be particularly noted that reservoir 40 is positioned at a greater height than annular chamber 33 so that the oil flows under the influence of gravity. As a practical matter, the surface of oil 41 in reservoir 40 may be approximately one foot above chamber 33 so that a one foot head exists in chamber 33 in bushing 25.

Upon reaching shaft 11, oil 41 can flow in two directions. One path is downward through the clearance between shaft 11 and bore 26 into sump 17. The pressure differential in this path, between annular chamber 33 and sump 17, is approximately 1 foot because reservoir 40 and sump 17 are both at atmospheric pressure. The oil that passes through bushing 25 in this direction is lost and unusable and is conducted via passage 18 and conduit 19 to a suitable dump.

The second oil path is upward through the clearance between shaft 11 and bore 26 towards rotor chamber 13. Ignoring for the moment annular chamber 34, the differential head pressure between chamber 33 and chamber 13 is approximately 30 feet because there is a vacuum in chamber 13. The oil that passes into chamber 13 also becomes contaminated and is lost. This oil is conducted via a passage 22 and a conduit 23 to a suitable dump. Again ignoring chamber 34, tests show that about 85% to 95% of oil 41 flows upwardly due to the greater pressure difference.

Now considering the effect of chamber 34, the oil flowing from annular chamber 33 upward along shaft 11 encounters chamber 34. Chamber 34 is not connected directly to rotor chamber 13 but is connected via a second conduit means including outlet passage 36 and conduit 38 to oil reservoir 45. Oil reservoir 45 has a vacuum therein and is physically located above oil reservoir 40. Typically, oil reservoir 45 is about six inches higher than reservoir 40. However, the pressure differential between chambers 33 and 34 is still approximately thirty feet since reservoir 40 is at atmospheric pressure and reservoir 45 is in a vacuum. Thus, upon reaching chamber 34, there are still two paths for the oil flow. One path is through passage 36 and conduit 38 to reservoir 45 and the second path is through the clearance between shaft 11 and bore 26 in bushing 25 to rotor chamber 13. The clearance between shaft 11 and bore 26 in the upper part of bushing 25 is very small so that the restriction presented to the oil flowing from the chamber 34 through the second conduit means including passages 36 and 38 is substantially less than the restriction presented to the flow of oil by the portion of bushing 25 between chamber 34 and rotor chamber 13. Furthermore, since reservoir 45 is also in a vacuum, a major portion of oil 41 will flow through passage 36 and conduit 38 into reservoir 45, with the flow from chamber 33 to rotor chamber 13 being pressurized by only a 1.5 foot head, the height difference between reservoir 45 and chamber 33.

Therefore, the oil that is now lost into vacuum chamber 13 is of about the same quantity as is lost into drive sump 17. The remaining oil flows into reservoir 45 and only about 5% to 10% of the oil is lost instead of 100% as before. Furthermore, because of the substantial area of bushing 25 between chamber 34 and rotor chamber 13, the oil entering chamber 34 is relatively uncontaminated because it is in a closed system. Therefore, if the oil in reservoir 45 can be reclaimed in an efficient and economical manner, it can be used again.

Referring now to FIGS. 1 and 2, bottom 39 of reservoir 40 is provided with a cylindrical valve housing 52 having an axial bore 53 which connects with conduit 49. Valve 50 consists of a flat disc 54 which sits on an "O" ring 55 within a recess 56 at the upper end of housing 52. Disc 54 is retained within the upper end of housing 52 by a conventional snap ring 57. A plurality of slots 58 in housing 52, between recess 56 and snap ring 57, permit oil flow into reservoir 40 from bore 53.

In operation, valve 50 permits automatic reclaiming of the uncontaminated oil 41 in reservoir 45. Valve 50 prevents oil flow between reservoirs 40 and 45 as long as reservoir 45 has a vacuum therein and automatically permits oil flow from reservoir 45 to reservoir 40 when such vacuum is released. More specifically, when centrifuge 1 is started, all of oil 41 will be in atmospheric reservoir 40. In order to run an ultracentrifuge, it is necessary to first pull a vacuum in the rotor chamber. By connecting conduit 47 with conduit 15 to the vacuum source, a vacuum can be simultaneously pulled in reservoir 45. At this time, valve 50 automatically closes to prevent oil 41 in reservoir 40 from being drawn into reservoir 45. More specifically, if a vacuum is pulled on reservoir 45, the pressure differential between reservoirs 40 and 45 causes disc 54 to seal against "O" ring 55 thereby closing conduit 49. While centrifuge 1 continues to run, oil 41 passes from reservoir 40 to reservoir 45 as described previously.

When centrifuge 1 stops and the vacuum is released, there is then created a differential pressure in conduit 49 in the opposite direction because of the difference in height between reservoirs 40 and 45. This differential pressure causes oil 41 to flow from reservoir 45 back into reservoir 40 for reuse. Disc 54 is held away from "O" ring 55 by the oil flow and is contained within valve housing 52 by snap ring 57. Oil 41 flows between disc 54 and "O" ring 55 and through slots 58 in housing 52 into reservoir 40. When the oil flow stops, disc 54 settles back onto "O" ring 55 due to gravity.

It can therefore be seen that in accordance with the present invention, the prior art problems associated with vacuum bushing-type drive systems for ultracentrifuges have been solved by providing a novel flow-thru vacuum bushing. The present bushing design minimizes excessive oil loss due to the high pressure differential thereacross. In addition, bushing 25 in combination with valve 50 allows automatic reclaiming and reusing of a major portion of the oil flow. Furthermore, such reclaimed oil is uncontaminated and may be reused with no difficulty. According to the present invention, oil 41 from reservoir 40 is collected in reservoir 45 and automatically returns to reservoir 40 from reservoir 45 when operation of centrifuge 1 is completed and the vacuum released.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

We claim:

1. In a vacuum centrifuge of the type including: a bushing through which a rotor drive shaft passes from atmospheric conditions into an evacuated rotor chamber, said bushing having a first annular chamber surrounding said drive shaft adjacent the atmospheric side of said bushing; a first oil reservoir at atmospheric pressure; and first conduit means for conducting oil from said first atmospheric oil reservoir to said first annular chamber, said first atmospheric oil reservoir being positioned at a greater height than said first annular chamber whereby said oil flows by gravity to said first annular chamber, said oil flowing from said annular chamber along said shaft primarily towards said rotor chamber, the improvement wherein said bushing has a second annular chamber surrounding said drive shaft and positioned between said first annular chamber and said rotor chamber and comprising:
   a second oil reservoir adapted to have air pressure evacuated therefrom;
   second conduit means for connecting said second annular chamber to said second oil reservoir; and
   said drive shaft and said bushing being so arranged and constructed as to produce a restriction to the flow of oil along said shaft between said second annular chamber and said rotor chamber which is substantially greater than the restriction to flow of oil in said second conduit whereby substantially all of said oil flowing along said shaft is directed from said second annular chamber via said second conduit means to said second oil reservoir when said second oil reservoir has air pressure evacuated therefrom.

2. In a vacuum centrifuge according to claim 1, the improvement wherein said portion of said bushing between said second annular chamber and said rotor chamber has the same clearance as the remainder of said bushing.

3. In a vacuum centrifuge according to claim 1, the improvement wherein said second oil reservoir is positioned at a height above the height of said first reservoir and further comprising:
   third conduit means for conducting the oil from said second reservoir to said first reservoir at atmospheric pressure; and
   one-way check valve means associated with said third conduit means for preventing oil flow from said vacuum reservoir to said first reservoir as long as said second reservoir has a vacuum therein and for automatically permitting oil flow from said second reservoir to said first reservoir when said vacuum is released.

4. In a vacuum centrifuge according to claim 3, the improvement wherein said third conduit means is connected between the bottom of said second reservoir and the bottom of said atmospheric reservoir.

5. In a vacuum centrifuge according to claim 4, the improvement wherein said check valve means comprises:
   a valve housing having an axial bore in fluid communication with said third conduit means and said first atmospheric reservoir, said housing having an enlarged recess at the upper end thereof;
   an "O" ring positioned within said recess in said housing, said "O" ring surrounding the upper end of said axial bore;
   a disc having a diameter greater than the diameter of said bore in said housing; and
   means for retaining said disc above said "O" ring, perpendicular to the axis of said housing, the vacuum in said second reservoir automatically closing said disc against said "O" ring, said disc rising away from said "O" ring to permit oil flow from said second reservoir to said first atmospheric reservoir when said vacuum is released.

6. A vacuum centrifuge comprising:
   a source of vacuum;
   a rotor chamber adapted to be connected to said source of vacuum;
   a rotor within said chamber;
   a rotor drive shaft for driving said rotor;
   a bushing positioned within the base of said rotor chamber, said drive shaft passing from said rotor chamber through said bushing to a drive means situated in atmospheric conditions, said bushing having first and second axially spaced annular chambers surrounding said drive shaft, said first annular chamber being positioned adjacent the atmospheric side of said bushing, said second annular chamber being positioned adjacent the vacuum side of said bushing;

a first oil reservoir at atmospheric pressure being positioned at a height above said first annular chamber;

a second oil reservoir adapted to be connected to said source of vacuum and being positioned at a height above said first oil reservoir;

first conduit means for conducting oil from said first reservoir to said first annular chamber, said oil flowing from said first annular chamber along said shaft primarily towards said rotor chamber;

second conduit means for conducting oil from said second annular chamber to said second reservoir;

said rotor drive shaft and said bushing being so constructed and arranged as to produce a restriction to the flow of oil along said shaft from said second annular chamber to said rotor chamber that is substantially greater than the restriction of oil in said second conduit to said second oil reservoir when said second oil reservoir has air pressure evacuated therefrom whereby substantially all of said oil flowing along said shaft is directed from said second annular chamber via said second conduit means to said second oil reservoir when said second oil reservoir has air pressure evacuated therefrom; and third conduit means for conducting oil from said second oil reservoir to said first oil reservoir when said second oil reservoir is at atmospheric pressure.

7. A vacuum centrifuge according to claim 6 comprising:

one-way check valve means associated with said third conduit means for preventing oil flow from said second oil reservoir to said first oil reservoir as long as said second oil reservoir has a vacuum therein and for automatically permitting oil flow from said second oil reservoir to said first oil reservoir when said vacuum is released.

8. A vacuum centrifuge according to claim 7 wherein said check valve means is operated to a closed position by the vacuum in said second oil reservoir and is operated to an open position by the oil flow from said second oil reservoir to said first oil reservoir when the vacuum in said second oil reservoir is released.

9. A vacuum centrifuge according to claim 7, further comprising:

a valve housing having an axial bore in fluid communication with said third conduit means and said first oil reservoir, said housing having an enlarged recess at the upper end thereof;

an "O" ring positioned within said recess in said housing, said "O" ring surrounding the upper end of said axial bore;

a disc having a diameter greater than the diameter of said bore in said housing; and means for retaining said disc above said "O" ring, perpendicular to the axis of said housing, the vacuum in said second oil reservoir automatically closing said disc against said "O" ring, said disc rising away from said "O" ring to permit oil flow from said second oil reservoir to said first oil reservoir when said vacuum is released.

* * * * *